United States Patent
Armand et al.

(10) Patent No.: US 10,964,941 B2
(45) Date of Patent: Mar. 30, 2021

(54) SODIUM CERAMIC ELECTROLYTE BATTERY

(71) Applicant: FUNDACION CENTRO DE INVESTIGACION COOPERATIVA DE ENERGIAS ALTERNATIVAS CIC ENERGIGUNE FUNDAZIOA, Alava (ES)

(72) Inventors: Michel Armand, Paris (FR); Teofilo Rojo, Alava (ES); Gurpreet Singh, Alava (ES); Laida Otaegui Ameztegui, Alava (ES); Frederic Aguesse, Alava (ES); Lucienne Buannic, Suresnes (FR)

(73) Assignee: FUNDACION CENTRO DE INVESTIGACION COOPERATIVA DE ENERGIAS ALTERNATIVAS CIC ENERGIGUNE FUNDAZIOA, Alava (ES)

( * ) Notice: Subject to any disclaimer, the term of this patent is extended or adjusted under 35 U.S.C. 154(b) by 251 days.

(21) Appl. No.: 15/519,416

(22) PCT Filed: Oct. 14, 2015

(86) PCT No.: PCT/EP2015/073756
§ 371 (c)(1),
(2) Date: Apr. 14, 2017

(87) PCT Pub. No.: WO2016/059098
PCT Pub. Date: Apr. 21, 2016

(65) Prior Publication Data
US 2017/0250406 A1  Aug. 31, 2017

(30) Foreign Application Priority Data

Oct. 14, 2014  (EP) .................................... 14382393

(51) Int. Cl.
H01M 4/485 (2010.01)
H01M 4/40 (2006.01)
(Continued)

(52) U.S. Cl.
CPC ............... *H01M 4/485* (2013.01); *C08K 3/08* (2013.01); *C08K 3/10* (2013.01); *C08K 3/22* (2013.01);
(Continued)

(58) Field of Classification Search
CPC ...... H01M 4/485; H01M 4/40; H01M 4/5825; H01M 10/0562; H01M 10/0564;
(Continued)

(56) References Cited

U.S. PATENT DOCUMENTS

2007/0218361 A1  9/2007  Inoue et al.
2010/0279174 A1  11/2010  Young
(Continued)

FOREIGN PATENT DOCUMENTS

EP     2485317 A1   8/2012
WO  2014159542 A1  10/2014

OTHER PUBLICATIONS

A. Abouimrane, et al; Liquid electrolyte based on lithium bis-fluorosulfonyl imide salt: Aluminum corrosion . . . ; Journal of Power Sources 189; 2009; pp. 693-696.
(Continued)

*Primary Examiner* — Stephen J Yanchuk
(74) *Attorney, Agent, or Firm* — Lucas & Mercanti, LLP (57) ABSTRACT

The present invention relates to a sodium-ion battery comprising a positive electrode compartment comprising a positive electrode, said positive electrode comprising a Na-insertion compound; a negative electrode compartment comprising a negative electrode, said negative electrode comprising metallic sodium; and an electrolyte composition
(Continued)

comprising a solid sodium-ion conductive ceramic electrolyte and a catholyte comprising a metallic salt with formula MY, wherein M is a cation selected from an alkali metal and an alkali-earth metal; and Y is an anion selected from $[R^1SO_2NSO_2R^2]$, $CF_3SO_3^-$, $C(CN)_3^-$, $B(C_2O_4)_2^-$ and $BF_2(C_2O_4)^-$, wherein $R_1$ and $R_2$ are independently selected from fluorine or a fluoroalkyl group. The device is able to operate below the melting point of the anode component.

18 Claims, 7 Drawing Sheets (51) Int. Cl.
| H01M 4/58 | (2010.01) |
| H01M 10/054 | (2010.01) |
| H01M 10/056 | (2010.01) |
| H01M 10/0562 | (2010.01) |
| H01M 10/0564 | (2010.01) |
| C08K 3/08 | (2006.01) |
| C08K 3/10 | (2018.01) |
| C08K 3/22 | (2006.01) |

(52) U.S. Cl.
CPC ........... H01M 4/40 (2013.01); H01M 4/5825 (2013.01); H01M 10/054 (2013.01); H01M 10/056 (2013.01); H01M 10/0562 (2013.01); H01M 10/0564 (2013.01)

(58) Field of Classification Search
CPC ............ H01M 10/054; H01M 10/056; H01M 10/399; H01M 10/36; H01M 10/4235; H01M 2300/0091; H01M 2300/0022; H01M 2300/0045; C08K 3/08; C08K 3/10; C08K 3/02
See application file for complete search history.

(56) References Cited

U.S. PATENT DOCUMENTS

| 2012/0058393 | A1* | 3/2012 | Fukunaga | H01M 4/381 429/200 |
| 2014/0212707 | A1* | 7/2014 | Bhavaraju | H01B 1/122 429/52 |
| 2014/0212755 | A1* | 7/2014 | Wu | H01M 4/131 429/221 |

OTHER PUBLICATIONS

G.B. Appetecchi, et al; Lithium insertion in graphite from ternary ionic liquid-lithium salt electrolytes . . . ; Journal of Power Sources 192; 2009; pp. 599-605.
J. Barker, et al; A sodium-ion cell based on the fluorophosphate compound NaVPO4F; Electrochemical and Solid-State Letters; 6 (1); 2003; pp. A1-A4.
B.L. Ellis, et al; A multifunctional 3.5 V iron-based phosphate cathode for rechargeable batteries; Nature Materials; Letters; vol. 6; Oct. 2007; pp. 749-753.
R.K.B. Gover; et al; The electrochemical insertion properties of sodium vanadium fluorophosphate . . . ; ScienceDirect; Solid State Ionics; 177; (2006); pp. 1495-1500.
H.B. Han, et al; Lithium bis(fluorosulfonyl)imide (LiFSI) as conducting salt for nonaqueous liquid electrolytes for . . . ; Journal of Power Sources; 196; (2011); pp. 3623-3632.
Z. Liu, et al; Preparation of NaV1—xAlxPO4F cathode materials for application of sodium-ion battery; ScienceDirect; Trans. Nonferrous Met. Soc. China; 18, (2008); pp. 346-350.
L. Niedzicki, et al; New covalent salts of the 4+ V class for Li batteries; Journal of Power Sources; 196; (2011); pp. 8696-8700.
V. Palomares, et al; Na-ion batteries, recent advances and present challenges to become low cost energy . . . ; Energy & Environmental Science; Review; DOI: 10.1039/c2ee02781j; 18 pages.
N. Recham, et al; Ionothermal synthesis of sodium-based fluorophosphate cathode materials; Journal of the Electrochemical Society; 156; 12; (2009); pp. A993-A999.
T. Shiratsuchi, et al; FePO4 cathode properties for Li and Na secondary cells; ScienceDirect; Journal of Power Sources; 159; (2006); pp. 268-271.
C. Vidal-Abarca, et al; Improving the cyclability of sodium-ion cathodes by selection of electrolyte solvent; Journal of Power Sources; 197; (2012); pp. 314-318.
S. Wenzel, et al; Thermodynamics and cell chemistry of room temperature sodium/sulfur cells with liquid and . . . ; Journal of Power Sources; 243; (2013); pp. 758-765.
N. Yabuuchi, et al; P2-type Nax[Fe1/2Mn1/2]O2 made from earth-abundant elements for rechargeable Na batteries; Nature Materials; Letters; vol. 11; Jun. 2012; pp. 512-517.
K. Zaghib, et al; Characterization of Na-based phosphate as electrode materials for electrochemical cells; Journal of Power Sources; 196; (2011); pp. 9612-9617.
J. Zhao, et al; A novel sol-gel synthesis route to NaVPO4F as cathode material for hybrid lithium ion batteries; Journal of Power Sources; 195; (2010); pp. 6854-6859.
International Search Report dated Jan. 4, 2016 for PCT/EP2015/073756.
Written Opinion dated Jan. 4, 2016 for PCT/EP2015/073756.

* cited by examiner

SODIUM CERAMIC ELECTROLYTE BATTERY

CROSS REFERENCE TO RELATED APPLICATION

The Application is a 371 PCT/EP2015/073756 filed on Oct. 14, 2015, which, in turn, claimed the priority of European Patent Application No. 14382393.8 filed on Oct. 14, 2014, both applications are incorporated herein by reference.

FIELD OF THE INVENTION

The present invention relates to the field of secondary batteries, and more specifically to sodium batteries with reduced operating temperatures and long operating life. In particular, it refers to a low-temperature sodium ceramic electrolyte battery having a negative electrode comprising sodium, a ceramic electrolyte, a catholyte comprising a low melting temperature sodium salt or mixtures of salts, and a positive electrode comprising a sodium insertion compound. The invention further relates to particular designs of a sodium battery.

BACKGROUND

In recent years, the energy future of mankind has become a hot topic, generating unprecedented interests around the world. At the center is the sustainability and cleanness of an energy system. Energy is needed for heating homes, running factories, lighting up cities, and powering cars. Currently, most of the energy comes from fossil fuels including oil, coal, and natural gas. The fossil fuels have become one critical resource without which the current way of civil life cannot continue. As a result, the development of an economy based on sustainable and clean energy has become an urgent need for many countries. The key to a sustainable and clean energy economy is to obtain energy from renewable sources and use it with minimum harmful impacts to the environment. Major renewable energy sources include solar, hydro, wind, tide, geothermal and biomass. It is envisioned that all of these renewable energy sources will play a part in the future sustainable energy structure.

To better utilize these energy sources, especially for those intermittent ones such as wind and solar, breakthroughs in energy storage technologies are needed. For example, if the renewable energy sources are used to produce electricity, storage devices are needed to store and distribute the electric energy. Additionally, the electric energy storage technologies can be used for optimizing the existing generation and transmission infrastructures and improving overall power quality and reliability.

Batteries based in inorganic solid electrolytes offer some advantages compared to conventional organic liquid electrolyte based batteries. Ceramic electrolytes are usually more stable in a wider voltage and temperature range, as well as in highly oxidizing and reducing environments. Moreover, they constitute a physical dense barrier against positive and negative electrode contact due to Na dendrite formation or accidental temperature increase and Na melting.

Sodium-beta alumina batteries (NBBs), based on a molten Na anode and beta-alumina solid electrolyte, have recently gained increasing interests as an electrical energy storage device for renewable integration and grid applications, along with commercial or fleet transportation. There are mainly two types of NBBs that have been widely studied, based on the particular cathode material: ZEBRA battery and sodium-sulfur battery.

ZEBRA batteries use a metal chloride such as $NiCl_2$, $FeCl_2$ and $ZnCl_2$ as active material in the cathode. It typically needs a molten secondary electrolyte (i.e., $NaAlCl_4$) in the cathode so as to ensure facile sodium ion transport between the beta-alumina electrolyte and solid cathode materials. ZEBRA battery was first invented in 1985 by the Zeolite Battery Research Africa Project (ZEBRA) group led by Dr. Johan Coetzer. There have been a lot of research and development activities and publications for Zebra batteries in the past 25 years. One of the main drawbacks of these batteries is that they can only cycle up to a couple of thousands cycles and operates at 300° C. One of the major failure mechanisms is electrical short-circuit due to the corrosion of the insulators or break of alumina ceramics as a result of the operating temperatures.

Currently, only Fiamm® in Italy manufactures commercial Zebra batteries for a variety of applications. They use a Ni—Fe alloy mixed with NaCl as the cathode, which is loaded into a beta-alumina tube. The tube is inserted into a rectangular stainless steel can. The cell is assembled in discharged state so that there is no need to deal with metallic sodium. Their typical cells have a capacity of 38 Ah. Various modules and packs are also being developed for different applications. The major issue that prevents ZEBRA batteries from penetrating a broad market is still the cost. Currently, ZEBRA batteries cost 300-500 €/kWh. General Electric is also launching mass production of ZEBRA batteries for locomotive and backup power applications.

There are some other efforts in developing ZEBRA batteries for different applications. The major focuses are: (1) reducing operating temperature to improve durability and low component and operational costs; (2) using innovative cell design to improve performance and cost. For example, Eagle Picher is developing a planar ZEBRA battery for renewable integration and grid applications. The program is being funded by US Department of Energy through ARPA-E program. It is using an inexpensive stacked design to improve performance at lower temperatures, leading to a less expensive overall storage technology. The new design greatly simplifies the manufacturing process for beta-alumina (or NASICON) membranes (a key enabling technology), providing a subsequent pathway to the production of scalable, modular batteries at half the cost of the existing tubular designs (http://arpa-e.energy.gov). Pacific Northwest National Laboratory is also working on the planar design of Zebra batteries, together with the optimization of cell components [http://energyenvironment.pnnl.gov/presentations/pdf/Planar%20Zebra.pdf].

Sodium-sulfur batteries use sulfur as the cathode. The technology was originally developed at Ford in the 1960s for automotive applications, but there haven't much activity in industrial development effort in the US. The Na—S technology has been mainly advanced in Japan in the past 30 years. Currently, Na—S batteries are only manufactured in Japan by NGK which is producing 90 MWh/year. The battery costs more than 400 €/kWh. The sodium-sulfur batteries also operate at high temperatures (300-350° C.). This high temperature is necessary for both the beta-alumina electrolyte and cathode constituents to achieve satisfactory electrochemical activities. The main drawbacks of sodium-sulfur batteries are: 1) the intrinsic corrosive behavior of polysulfide melts, which limits material selections for both cathode current collector and battery casing; and 2) high operating temperatures and open circuit cell failure mode. If the beta-alumina electrolyte is facing mechanical failure during battery operation, molten sulfides come in direct contact with the molten sodium (>98° C.) and the reactions between them are inherently vigorous.

Therefore, there is still much interest in developing low cost sodium ceramic electrolyte batteries for electric energy storage applications which are safer and operate at low temperature.

BRIEF DESCRIPTION OF THE INVENTION

The authors of the present invention have developed a sodium-ion battery as energy storage device which exhibits lower operating temperatures, better cycle life and improved safety compared to sodium-sulfur and/or ZEBRA batteries. These properties make them suitable for a variety of applications including, but not limited to, renewable integration and grid applications, as well as commercial and fleet transportation.

The sodium battery of the invention is characterized for using a ceramic electrolyte combined with a sodium insertion compound in the cathode and a second electrolyte, also known as catholyte. When using a sodium insertion compound in the cathode and a catholyte in combination with a solid ceramic electrolyte, the operating temperature can decrease from 300° C. to below the melting point of the component of the anode (metallic sodium), which reduces the corrosion of the battery components and allows new designs with better robustness, thus extending the life of the battery. Lowering the operation temperature also allows the use of inexpensive cell components such as housing, sealing, and aluminum current collectors which reduces operating costs and improves battery safety and cycling life.

Furthermore, as shown in the experimental part, although the metallic sodium present in the anode remains in solid state at operating conditions, a good contact between the solid metallic sodium of the anode and the ceramic electrolyte can be obtained under certain contact pressure conditions, without significant polarization losses.

Thus, a first aspect of the present invention refers to a sodium-ion battery comprising:
a) a positive electrode compartment comprising a positive electrode, said positive electrode comprising a compound selected from:
a sodium transition metal based oxide of formula (I):

$$Na_xM_yO_w \qquad (I)$$

wherein M is a transition metal ion or a combination of multivalent ions comprising at least one transition metal ion; $0 < x \leq 1$; $0 < y \leq 1$; $w \geq 2$;
and
a sodium metal salt of formula (II):

$$Na_xM_y(XO_4)_vF_z \qquad (II)$$

wherein M is a transition metal ion or a combination of multivalent ions comprising at least one transition metal; X is S or P; $0 < x \leq 3$; $0 < y \leq 2$; $1 \leq v \leq 3$; $0 \leq z \leq 3$.
b) a negative electrode compartment comprising a negative electrode, said negative electrode comprising solid metallic sodium or an alloy comprising solid metallic sodium;
c) an electrolyte composition comprising:
a solid sodium-ion conductive ceramic electrolyte, wherein said ceramic electrolyte has:
an anode side in contact with the solid metallic sodium, or with the alloy comprising solid metallic sodium, comprised in the negative electrode of the negative electrode compartment, and
a cathode side in contact with the positive electrode compartment,
so as said solid sodium-ion conductive ceramic electrolyte separates the negative and positive electrode compartments;
a catholyte, said catholyte comprising a compound selected from:
a metallic salt represented by the formula (III) or a mixture thereof, optionally dissolved in an organic solvent or in an ionic liquid:

$$MY \qquad (III)$$

wherein:
M is a cation selected from an alkali metal and an alkali-earth metal; and
Y is an anion selected from $[R^1SO_2NSO_2R^2]$, $CF_3SO_3^-$, $C(CN)_3^-$, $B(C_2O_4)_2^-$ and $BF_2(C_2O_4)^-$, wherein $R_1$ and $R_2$ are independently selected from fluorine or a fluoroalkyl group.
and
a salt selected from $NaSbF_6$, $NaAsF_6$, $NaBF_4$, $NaClO_4$, $NaPF_6$, and a mixture thereof, dissolved in an organic solvent or in an ionic liquid;
wherein said catholyte is located within the positive electrode compartment in contact with the positive electrode and with the cathode side of the solid ceramic electrolyte; and
and optionally, an anolyte, said anolyte comprising a compound selected from:
a metallic salt represented by the formula (III) or a mixture of thereof, optionally dissolved in an organic solvent or in an ionic liquid:

$$MY \qquad (III)$$

wherein:
M is a cation selected from an alkali metal and an alkali-earth metal; and
Y is an anion selected from $[R^1SO_2NSO_2R^2]$, $CF_3SO_3^-$, $C(CN)_3^-$, $B(C_2O_4)_2^-$ and $BF_2(C_2O_4)^-$, wherein $R_1$ and $R_2$ are independently selected from fluorine or a fluoroalkyl group;
and
a salt selected from $NaSbF_6$, $NaAsF_6$, $NaBF_4$, $NaClO_4$, $NaPF_6$, and a mixture thereof, dissolved in an organic solvent or in an ionic liquid;
wherein said anolyte is located within the negative electrode compartment in contact with the negative electrode.

Another aspect of the present invention refers to a module system which comprises at least two stacked batteries as defined above.

A further aspect of the inventions relates to the use of a battery as defined above as energy storage device.

BRIEF DESCRIPTION OF THE FIGURES

FIG. 2. Cell design of sodium ceramic battery in a planar configuration. (a) Without anolyte and (b) with anolyte.

FIG. 6. Performance of the medium-temperature sodium-ion battery (55° C.) with and without β"-Al$_2$O$_3$ as electrolyte, NaFSI/C$_3$C$_1$pyrr[FSI] as catholyte, and Na[Fe$_{0.4}$Ni$_{0.3}$Ti$_{0.3}$]O$_2$ as insertion cathode: (a) First cycle, (b) capacity retention over cycling.

FIG. 7. Performance of the medium-temperature sodium-ion battery (55° C.) with and without β"-Al$_2$O$_3$ as electrolyte, NaFSI/C$_3$C$_1$pyrr[FSI] as catholyte, and Na[Mg$_{0.2}$Mn$_{0.8}$]O$_2$ as insertion cathode: (a) Fifth cycle, (b) capacity retention over cycling.

DETAILED DESCRIPTION OF THE INVENTION

In a first aspect, the present invention provides a sodium-ion battery which exhibits lower operating temperatures, better cycle life and improved safety compared to sodium-sulfur and/or ZEBRA batteries, making said sodium-ion battery very suitable for a variety of applications such as renewable integration and grid applications.

Figure 1:
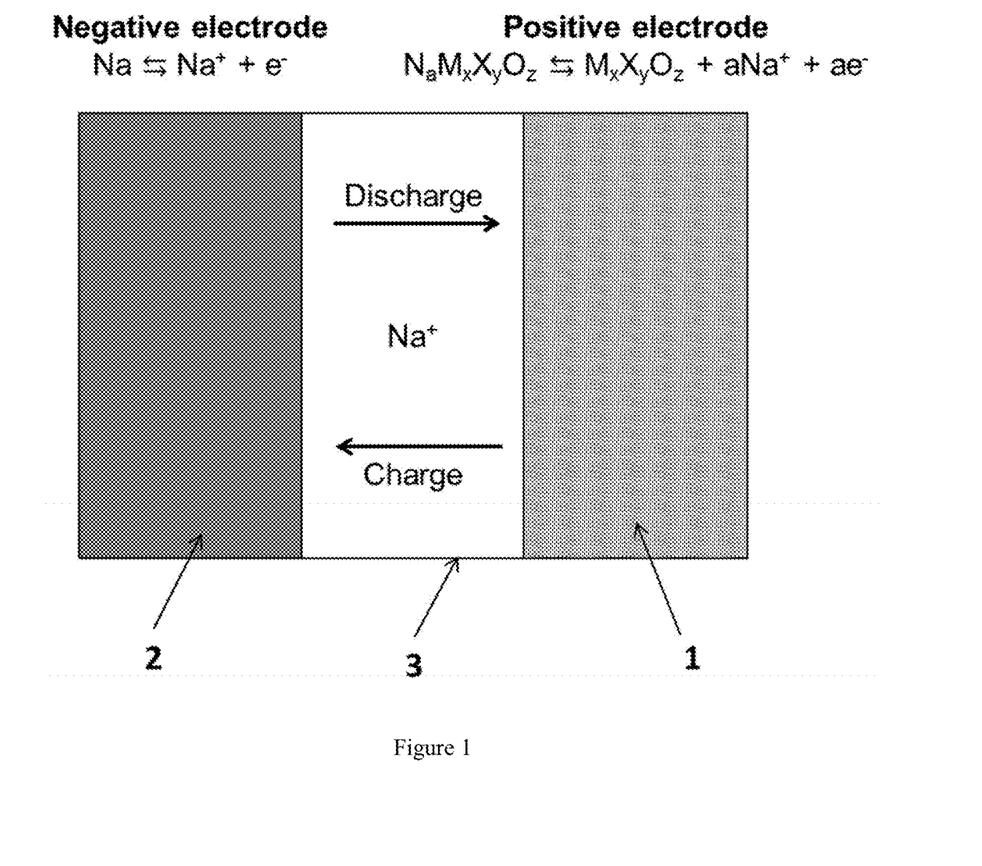
FIG. 1. Scheme of the sodium ceramic battery of the invention.

FIG. 1 illustrates the concept of the low-temperature sodium ceramic battery of the invention, which includes, among other components, a positive electrode compartment (1) comprising a Na-insertion compound; a negative electrode compartment (2) comprising solid metallic sodium; and a solid sodium ion-conductive ceramic electrolyte (3) separating both positive and negative electrode compartments. This battery transports sodium ions which diffuse through the solid ceramic electrolyte located between both electrode compartments.

The battery of the invention can be used as a primary battery but also a secondary battery capable of being charged and discharged through electrode reactions as shown below.

These chemical reactions generated during the electrochemical operation of the battery are shown below:

Negative electrode/Anode: Na ↔ Na$^+$e$^-$

Positive electrode/Cathode: Na$_x$MO$_2$ ↔ MO$_2$ + xNa$^+$ + xe$^-$

More specifically, during charge, sodium ions diffuse from the Na-insertion cathode (positive electrode compartment) to the anode (negative electrode compartment) through the ceramic electrolyte where they take an electron from the external circuit and are reduced to sodium metal.

On discharge, sodium is oxidized to sodium ions at the negative electrode, giving up an electron to the external circuit to generate power. The sodium ions diffuse to the positive electrode side, spontaneously driven by the electrochemical reaction.

A detailed explanation of the sodium-ion ceramic battery components used in the present invention is described below.

Positive Electrode

The positive electrode compartment hosts the positive electrode which constitutes the cathode of the battery of the invention. This positive electrode comprises a Na-insertion compound selected from:

a sodium transition metal based oxide of formula (I):

$$Na_xM_yO_w,$$ (I)

wherein M is a transition metal ion or a combination of multivalent ions comprising at least one transition metal ion; 0<x≤1; 0<y≤1; w≥2; and a sodium metal salt of formula (II):

$$Na_xM_y(XO_4)_vF_z$$ (II)

wherein M is a transition metal ion or a combination of multivalent ions comprising at least one transition metal ion; X is S or P; 0<x≤3; 0<y≤2; 1≤v≤3; 0≤z≤3.

In the chemical formulas (I) and (II), M represents a transition metal ion or a combination of multivalent ions comprising at least one transition metal ion.

In a preferred embodiment, M is selected from titanium, vanadium, chromium, molybdenum, tungsten, manganese, iron, osmium, cobalt, nickel, palladium, platinum, copper, silver, gold, zinc, cadmium, magnesium, calcium, beryllium, strontium, barium, aluminium, boron, niobium, antimony, tellurium, tantalum, bismuth and selenium ions, more preferably from iron, manganese, cobalt, nickel and titanium ions or combinations thereof.

In the chemical formula (I) above, a composition ratio "x" of Na is a real number satisfying relation of 0<x≤1, a composition ratio "y" of M is a real number satisfying relation of 0<y≤1, a composition ratio "w" of O is a real number satisfying relation of w≥2.

Particular examples of the compound of formula (I) are Na$_x$FeO$_2$, Na$_x$MnO$_2$, Na$_x$(Fe$_\alpha$Mn$_\beta$)O$_2$, Na$_x$(Mg$_\alpha$Mn$_\beta$)O$_2$, Na$_x$(Fe$_\alpha$Ni$_\beta$Ti$_\gamma$)O$_2$, wherein 0<x≤1; 0<α+β≤1; 0<α+β+γ≤1. More particularly, the compound of formula (I) can be Na$_{2/3}$[Mg$_{0.2}$Mn$_{0.8}$]O$_2$ or Na[Fe$_{0.4}$Ni$_{0.3}$Ti$_{0.3}$]O$_2$.

In the compound of formula (II), X is selected from sulfur and phosphorous, thus giving rise to a sodium metal phosphate, a sodium metal fluorophosphate, a sodium metal sulphate or a sodium metal fluorosulphate depending on the presence or absence of the fluorine atom.

In the chemical formula (II) above, a composition ratio "x" of Na is a real number satisfying relation of 0<x≤3, a composition ratio "y" of M is a real number satisfying relation of 0<y≤2, a composition ratio "v" of XO$_4$ is a real number satisfying relation of 1≤v≤3, and a composition ratio "z" of F is a real number satisfying relation of 0≤z≤3.

In a particular embodiment X is P, i.e., the compound of formula (II) is a sodium metal phosphate or a sodium metal fluorophosphate.

Particular examples of the compound of formula (II) are NaFePO$_4$, Na$_2$FePO$_4$F, Na$_2$Fe$_{1-n}$Mn$_n$PO$_4$F (0<n<1) Na$_3$V$_2$O$_{2x}$(PO$_4$)$_2$F$_{3-2x}$ (0<x<1) or NaVPO$_4$F.

These Na-insertion compounds can be synthesized by any method known by a skilled person as those mentioned in the following publications: Barker, J., *Electrochemical and Solid-State Letters*, 2003, 6(1), A1-A4; Gover R. K. B. et al., *Solid State Ionics*, 2006, 177, 1495-1500; Liu Zhi-ming, et al., *Trans. Nonferrous Met. Soc. China*, 2008, 18, 346-350; Zhao, J. et al., *Journal of Power Sources*, 2010, 195, 6854-6959; Zaghib, K., et al., *Journal of Power Sources*, 2011, 196, 9612-9617; Recham, N. et al., *Journal of the Electrochemical Society*, 2009, 156(12), A993-A999; Yabuuchi, N. et al., *Nature Materials*, 2012, 11, 512-517.

In a particular embodiment, the positive electrode further comprises a conductive additive acting as conducting material. Examples of conductive additives include carbon black or acetylene black. The addition of a conductive additive provides an excellent charge and discharge cycle characteristics and a high energy density can be obtained.

The content of the conductive additive in the positive electrode is preferably not higher than 40 mass % and not lower to 5 mass % of positive electrode in order to achieve the required charge and discharge cycle characteristics and a high energy density. It is noted that conductive additive does not necessarily have to be contained in the positive electrode if positive electrode has conductivity.

Additionally, any binder capable of securely adhering the Na-insertion compound contained in the positive electrode and the conductive additive to each other can be used. Without particularly limited, polytetrafluoroethylene (PTFE), polyvinylidene fluoride (PVDF), polyethylene-propylene-diene where the diene content is 10% or lower known as EPDM are preferred.

The content of binder in the positive electrode is preferably not higher than 40 mass % and not lower than 1 mass % in order to achieve a good adhesion between the Na-insertion compound and the conductive additive.

Electrolyte Composition

The electrolyte composition comprises a solid sodium-ion conductive ceramic electrolyte that conducts sodium ions during use between the negative and positive electrodes.

This solid sodium-ion conductive ceramic electrolyte has a cathode side defining the positive electrode compartment and an anode side defining the negative electrode compartment. Particularly, the solid sodium-ion conductive ceramic electrolyte has an anode side in contact with the negative electrode compartment and a cathode side in contact with the positive electrode compartment, so as the solid sodium-ion conductive ceramic electrolyte acts as a separator of the positive and negative electrode compartments.

In the context of the present invention the terms "solid sodium-ion conductive ceramic electrolyte", "ceramic electrolyte", "solid electrolyte" and "solid ceramic electrolyte" have the same meaning and they are interchangeable.

Suitable materials for the solid sodium-ion conductive ceramic electrolyte may include β-alumina, β'-alumina and β"-alumina. Other exemplary electrolyte materials include silicophosphates, such as NASICON ($Na_{3-x}Zr_2Si_{2+x}P_{1+x}O_{12}$) wherein $-1 \leq x \leq 2$, and glassy ceramics, such as alkali-silicon sulfide glasses.

In a preferred embodiment, the solid sodium-ion conductive ceramic electrolyte includes β"-alumina or NASICON, more preferably, the solid sodium-ion conductive ceramic electrolyte includes beta"-alumina.

The solid sodium-ion conductive ceramic electrolyte can be sized and shaped to have a cross-sectional profile that is square, polygonal, circular, or clover leaf, to provide a maximum surface area for sodium ion transport, and can have a width to length ratio that is greater than about 1:10 along a vertical axis.

The solid sodium-ion conductive ceramic electrolyte may be stabilized by the addition of small amounts of a dopant. The dopant may include one or more oxides selected from lithia, magnesia, zirconia, zinc oxide, and yttria. These stabilizers may be used alone or in combination or even combined with other materials. In a particular embodiment, the solid electrolyte comprises β"-alumina and may include one or more dopants.

The anode side of the solid sodium-ion conductive ceramic electrolyte is in physical contact with the solid metallic sodium, or with the alloy comprising solid metallic sodium, comprised in the negative electrode of the negative electrode compartment.

Particularly, it has been observed that best results are obtained when a pressure between 10 and 1000 kg/cm² is applied to stick the solid metallic sodium to the solid sodium-ion conductive ceramic electrolyte. Above such range the solid ceramic electrolyte can break, whereas below such range, the sodium cannot be properly stuck to the solid ceramic electrolyte.

Therefore, in a particular embodiment the solid sodium-ion conductive ceramic electrolyte and the solid metallic sodium, or the alloy comprising solid metallic sodium, comprised in the negative electrode are arranged to have a contact pressure ranging from 10 to 1000 kg/cm², more preferably from 50 to 500 kg/cm², even more preferably from 100 to 200 kg/cm².

The electrolyte composition further comprises a second electrolyte which is located within the positive electrode compartment in contact with the positive electrode and which is commonly known in the literature as catholyte. In the present invention, said catholyte comprises a compound selected from:
a metallic salt represented by the formula (III) or a mixture thereof, optionally dissolved in an organic solvent or in an ionic liquid:

MY      (III)

wherein:
M is a cation selected from an alkali metal and an alkali-earth metal; and
Y is an anion selected from $[R^1SO_2NSO_2R^2]$, $CF_3SO_3^-$, $C(CN)_3^-$, $B(C_2O_4)_2^-$ and $BF_2(C_2O_4)^-$, wherein $R_1$ and $R_2$ are independently selected from fluorine or a fluoroalkyl group;
and
a salt selected from $NaSbF_6$, $NaAsF_6$, $NaBF_4$, $NaClO_4$, $NaPF_6$ and a mixture thereof, dissolved in an organic solvent or in an ionic liquid.

In a preferred embodiment, the metallic salt of formula (III) is $M[R^1SO_2NSO_2R^2]$, wherein M is a cation selected from an alkali metal and an alkali-earth metal, and $R^1$ and $R^2$ are independently selected from F and $CF_3$, more preferably both are F or both are $CF_3$. When $R^1$ and $R^2$ are both F, the resulting anion is bis(fluorosulfonyl)imide anion (hereinafter referred to as "FSI anion"). When $R^1$ and $R^2$ are both $CF_3$, the resulting anion is bis(trifluoromethylsulfonyl)imide anion (hereinafter referred to as "TFSI anion").

Thus, in a particular embodiment, the catholyte includes a salt of MFSI, a salt of MTFSI, a mixture of two or more salts of MFSI, a mixture of two or more salts of MTFSI, or a mixture of one or more salts of MFSI and one or more salt of MTFSI, that contains FSI ions and/or TFSI ions as anions and contains ions of M representing any one type of alkali metal or alkali-earth metal as cations.

In another preferred embodiment, the cation M can be an alkaline metal selected from lithium (Li), sodium (Na), potassium (K), rubidium (Rb) and cesium (Cs).

In another preferred embodiment, the cation M can be an alkaline-earth metal selected from magnesium (Mg), calcium (Ca), strontium (Sr) and barium (Ba).

Examples of salts to be used as catholyte includes simple salts of LiFSI, NaFSI, KFSI, RbFSI, CsFSI, $Mg(FSI)_2$, $Ca(FSI)_2$, $Sr(FSI)_2$ and $Ba(FSI)_2$, LiTFSI, NaTFSI, KTFSI, RbTFSI, CsTFSI, $Mg(TFSI)_2$, $Ca(TFSI)_2$, $Sr(TFSI)_2$ and $Ba(TFSI)_2$ or combinations of two or more thereof.

In a more preferred embodiment, the salt is a sodium salt of formula $Na[R^1SO_2NSO_2R^2]$, wherein $R^1$ and $R^2$ are independently selected from fluorine or a fluoroalkyl group. In a preferred embodiment, $R^1$ and $R^2$ are independently selected from F and $CF_3$, more preferably both are F or both are $CF_3$. These preferred salts respond to NaFSI and NaTFSI according to the above nomenclature.

In another preferred embodiment, the catholyte is a combination of two or more salts of formula (III). More preferably is the use of an eutectic mixture having two or more salts of formula (III). In the context of the present invention, by the term "eutectic mixture" is understood a mixture of salts of formula (III) having a remarkably lower melting point than the melting point of each of the salt constituting the mixture.

More preferably is the use of a binary-system salt composed of a mixture of NaFSI and KFSI or a binary-system salt composed of a mixture of NaFSI and NaTFSI.

In a particular embodiment, the salt of formula (III) is dissolved in an organic solvent, such as propylene carbonate (PC), ethylene carbonate (EC), dimethyl carbonate (DMC), diethyl carbonate (DEC), di- tri- or tetra-glymes, polyethylene glycol dimethyl ether of $M_w$ comprised between 200 and 2000 or a binary or ternary mixture of the above mentioned solvents.

In another particular embodiment, the salt of formula (III) is dissolved in an ionic liquid. Examples of ionic liquids include those resulting from the combination of imidazole-type cations, more particularly alkyl-imidazole-type cations such as 1-ethyl-3-methylimidazolium cations; pyrrolidinium-type cations, more particularly alkyl pyrrolidinium-type cations such as N-ethyl-N-methyl pyrrolidinium cations, N-methyl-N-propylpyrrolidinium cations or N-methyl-N-butylpyrrolidinium cations; piperidinium cations, more particularly alkyl-piperidinium cations such as methyl-propyl-piperidinium; pyridinium-type cations, more particularly alkylpyridinium-type cations such as 1-methyl-pyridinium cations; quaternary ammonium-type cations, such as trimethylhexyl ammonium cations; pyrazole-type cations; phosphonium cations or sulfonium cations; with an anion selected from $R^3SO_2NSO_2R^4$, $CF_3SO_3^-$, $C(CN)_3^-$, $B(C_2O_4)_2^-$ and $BF_2(C_2O_4)^-$, wherein $R^3$ and $R^4$ are independently selected from fluorine and a fluoroalkyl group.

In another embodiment, the catholyte is a Na salt selected from $NaSbF_6$, $NaAsF_6$, $NaBF_4$, $NaClO_4$, $NaPF_6$ and mixtures thereof dissolved in an organic solvent, such as propylene carbonate (PC), ethylene carbonate (EC), dimethyl carbonate (DMC), diethyl carbonate (DEC), di- tri- or tetra-glymes, polyethylene glycol dimethyl ether of $M_w$ comprised between 200 and 2000 or a binary or ternary mixture of the above mentioned solvents.

In another particular embodiment, the catholyte is a Na salt selected from $NaSbF_6$, $NaAsF_6$, $NaBF_4$, $NaClO_4$, $NaPF_6$ and mixtures thereof dissolved in an ionic liquid.

Examples of ionic liquids include those resulting from the combination of imidazole-type cations, more particularly alkyl-imidazole-type cations such as 1-ethyl-3-methylimidazolium cations; pyrrolidinium-type cations, more particularly alkyl pyrrolidinium-type cations such as N-ethyl-N-methyl pyrrolidinium cations, N-methyl-N-propylpyrrolidinium cations or N-methyl-N-butylpyrrolidinium cations; piperidinium cations, more particularly alkyl-piperidinium cations such as methyl-propyl-piperidinium; pyridinium-type cations, more particularly alkylpyridinium-type cations such as 1-methyl-pyridinium cations; quaternary ammonium-type cations, such as trimethylhexyl ammonium cations; pyrazole-type cations; phosphonium cations or sulfonium cations; with an anion selected from $R^3SO_2NSO_2R^4$, $CF_3SO_3^-$, $C(CN)_3^-$, $B(C_2O_4)_2^-$ and $BF_2(C_2O_4)^-$, wherein $R^3$ and $R^4$ are independently selected from fluorine and a fluoroalkyl group.

In a particular embodiment, the electrolyte composition further comprises a third electrolyte which is located within the negative electrode compartment in contact with the negative electrode and which is commonly known in the literature as anolyte.

In a particular embodiment of the invention, said anolyte comprises a metallic salt of formula (III) as defined above, or a mixture of two or more salts thereof.

In a preferred embodiment, the salt of formula (III) can be any of those mentioned above for the composition of the catholyte.

The salt of formula (III) can also be dissolved in an organic solvent or in an ionic liquid, such as those already described for the composition of the catholyte.

In a particular embodiment, the anolyte is a Na salt selected from $NaSbF_6$, $NaAsF_6$, $NaBF_4$, $NaClO_4$, $NaPF_6$ and mixtures thereof dissolved in an organic solvent or in an ionic liquid such as those mentioned above.

In a preferred embodiment, the composition of the anolyte comprises di-, tri- or tetra-glymes, polyethylene glycol dimethyl ether of $M_w$ comprised between 200 and 2000 and their mixtures.

In a particular embodiment, the electrolyte composition is devoid of any anolyte.

In another particular embodiment, the electrolyte composition further comprises a layer of a porous material on the cathode side of the solid sodium-ion conductive ceramic electrolyte in contact with it, being this layer of the porous material impregnated in the catholyte.

In another particular embodiment, the solid ceramic electrolyte is sandwiched between two layers of a porous material, one being impregnated in the catholyte and the other in the anolyte when this is present. As this material is porous, the contact between the solid ceramic electrolyte and the solid metallic sodium comprised in the negative electrode is still assured.

In both particular embodiments, the porous material can be made, independently, of glass fiber, polypropylene or polyethylene.

Negative Electrode

The negative electrode constitutes the anode of the battery and comprises, as the main component, solid metallic sodium or an alloy comprising solid metallic sodium.

In a particular embodiment, the content of solid metallic sodium in the negative electrode is higher than 50 wt %, more preferably higher than 70 wt %, even more preferably higher than 90 wt %.

In a particular embodiment, the negative electrode constitutes the anode of the battery and consists of solid metallic sodium or of an alloy comprising solid metallic sodium.

As will be appreciated by the context of this disclosure, the negative electrode is located within the negative electrode compartment in physical contact with the anode side of the solid sodium-ion conductive ceramic electrolyte. Particularly, it is the solid metallic sodium, or the alloy comprising solid metallic sodium, comprised in the negative electrode which is in physical contact with the anode side of the solid sodium-ion conductive ceramic electrolyte.

Figure 2:
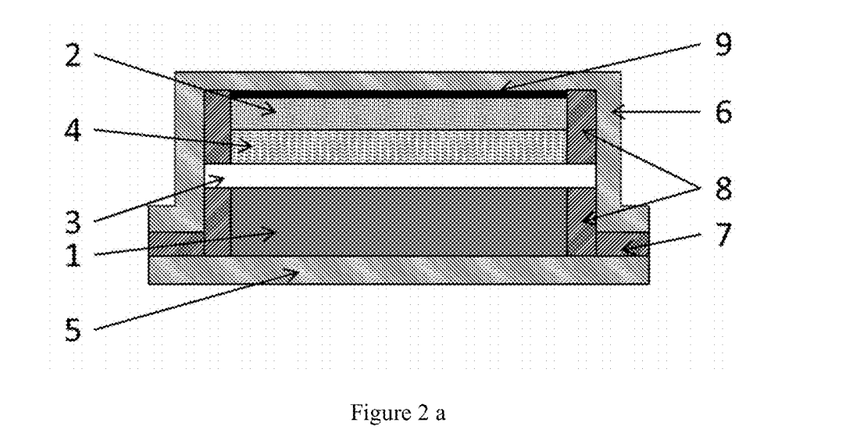
Figure 2B:
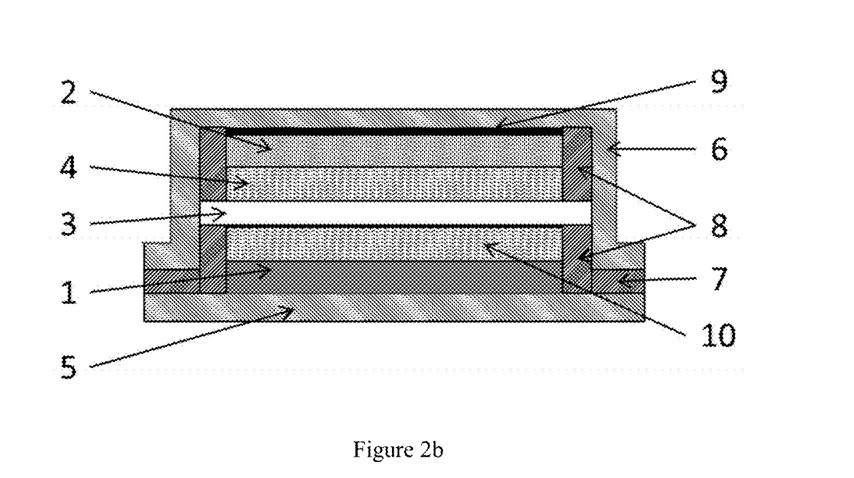
Figure 3:
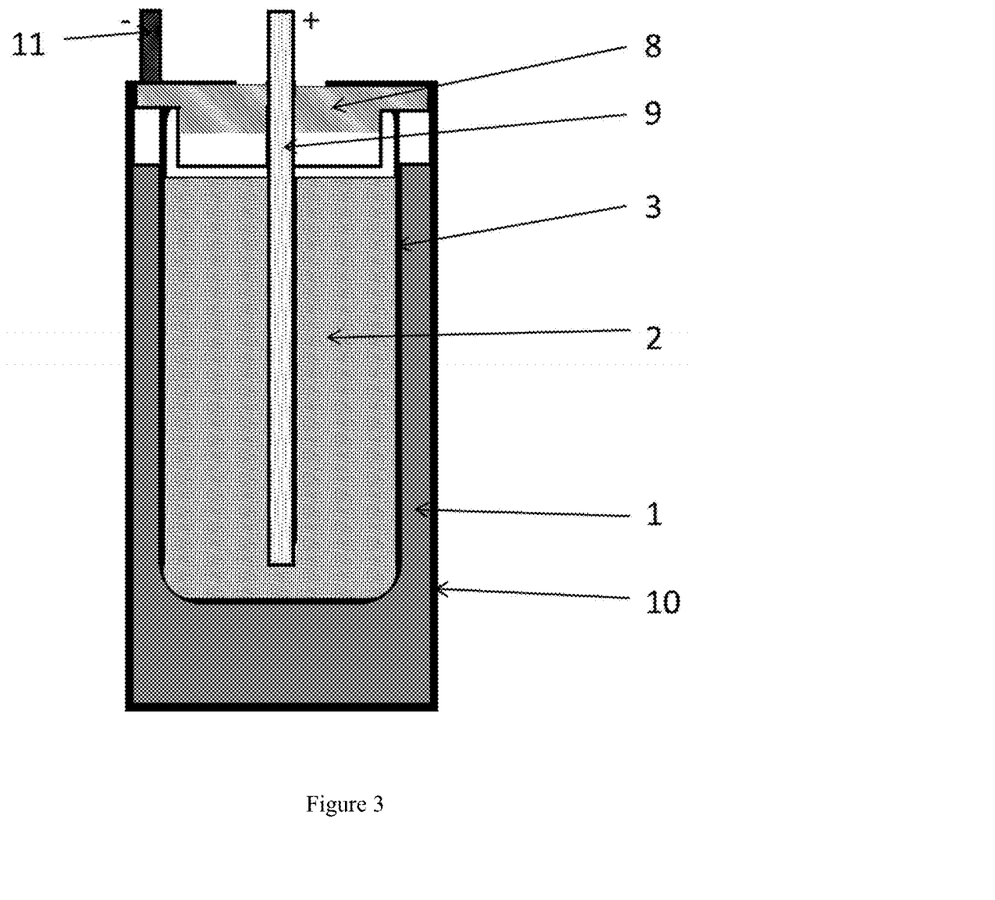
FIG. 3: Cell design of sodium-ion battery in a tubular configuration.

Schematic drawings of the planar and tubular configurations are represented in FIGS. 2 and 3 which are explained in detail herein below.

As the battery of the invention allows working near room temperature, the metallic sodium remains in solid state at operating conditions.

The use of solid metallic sodium is advantageous with respect to molten sodium as it considerably improves the battery safety. Indeed, molten sodium behaves as a liquid and leakage and short circuit may happen due to the high reactivity of this alkali metal.

Besides, at temperatures higher than the melting point, sodium metal does not wet the solid ceramic electrolyte surface. However, contrary to what it would be expected, a good contact/adhesion between the solid sodium-ion conductive ceramic electrolyte and the metallic sodium in solid state has been found without significant polarization losses. As mentioned before, a good adhesion/contact between the solid sodium-ion conductive ceramic electrolyte and the metallic sodium in solid state contained in the negative electrode can be obtained under a contact pressure from 10 to 1000 kg/cm$^2$ between both components of the sodium-ion battery of the invention. Therefore, due to this unexpected behavior, the battery of the invention operates at temperatures below the melting point of sodium, including room temperature.

In a particular embodiment, the negative electrode further comprises additives which include an oxygen scavenger. Suitable metal oxygen scavengers include one or more of manganese, vanadium, zirconium, aluminum or titanium.

Figure 6A:
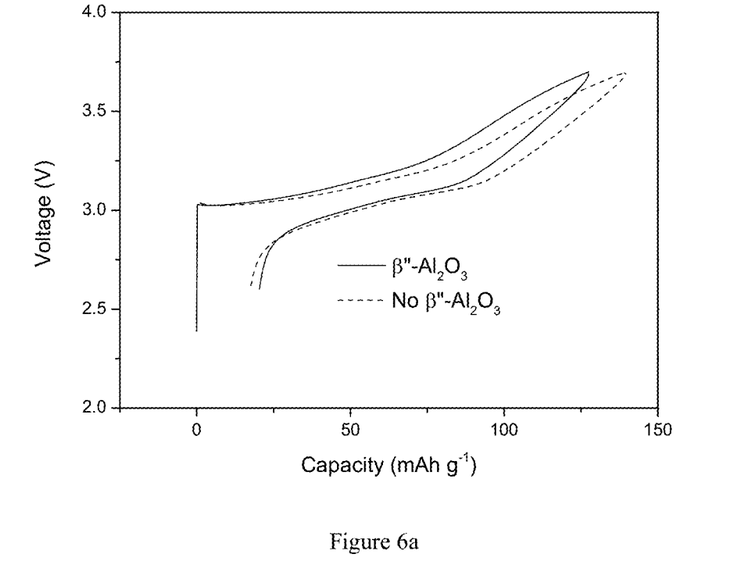
Figure 6B:
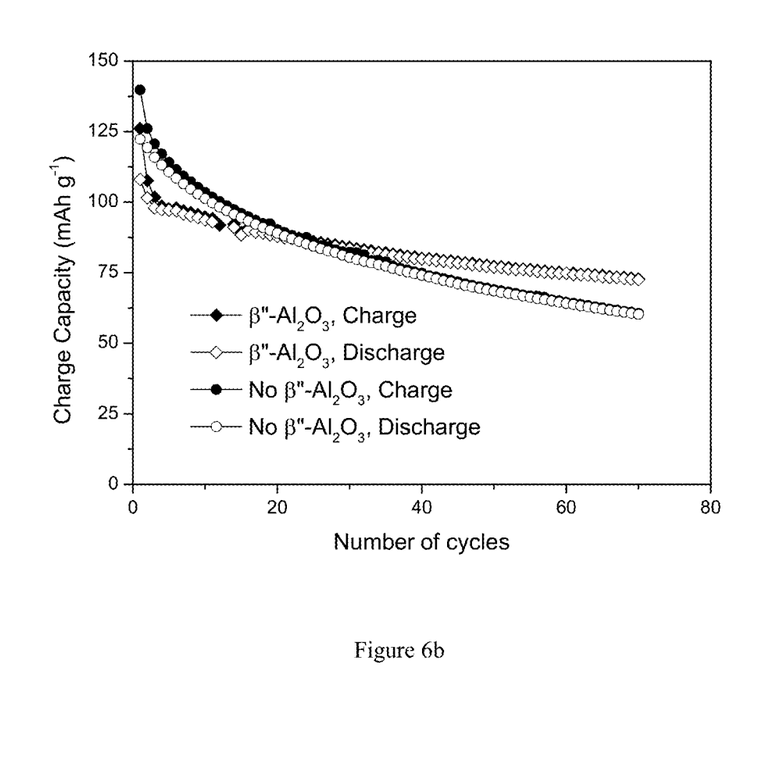
Figure 7A:
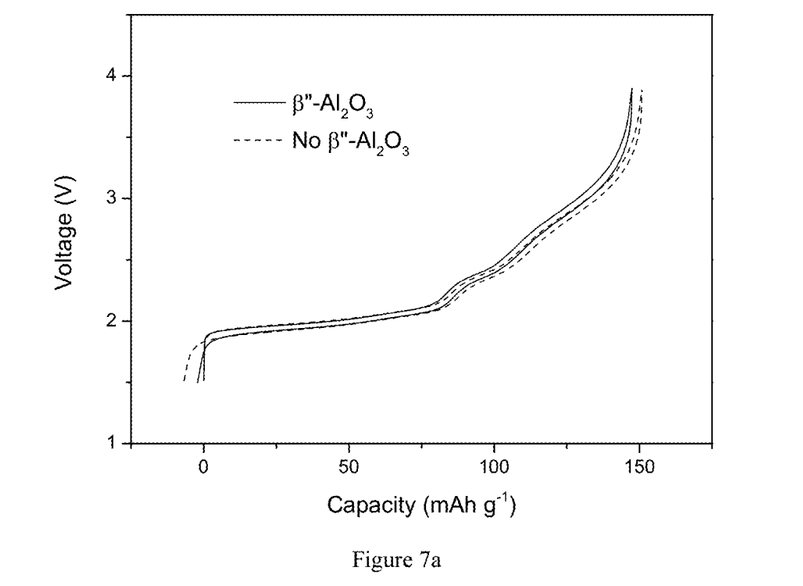
Figure 7B:
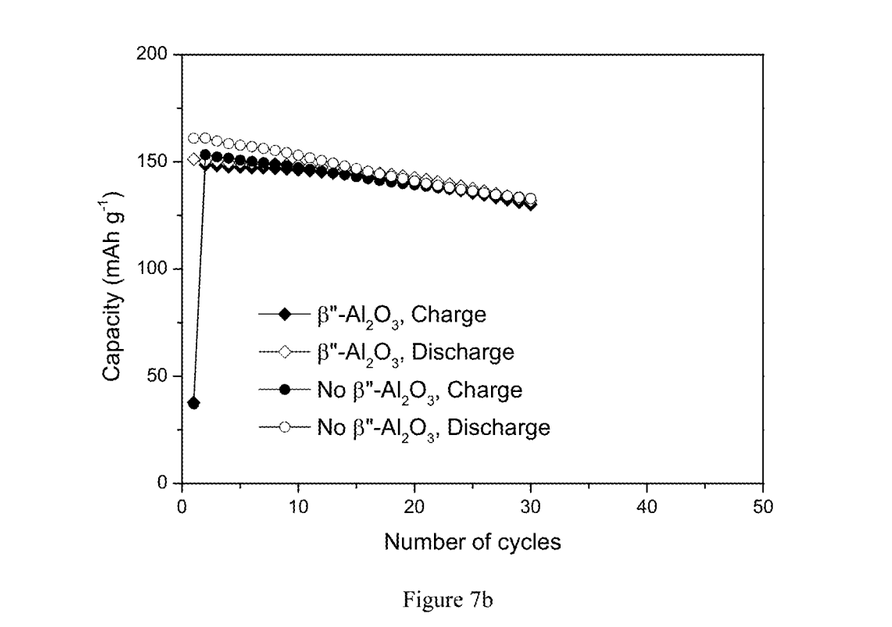

It is extensively reported that molten Na and beta-alumina wetting is problematic (J. L. Sudworth, *The Sodium Sulphur Battery*, 1985, p. 230), therefore, other useful additives have been used which include materials that increase wetting of the solid electrolyte surface defining the negative electrode compartment. However, in the particular case in which sodium is present in the solid phase as in the present invention, Na/beta-alumina contact was unexpectedly not problematic and similar performances to those obtained without the beta-alumina solid electrolyte were achieved (FIG. 6 and FIG. 7).

In a particular embodiment, the negative electrode compartment, the electrolyte composition and the positive electrode compartment are incorporated in a battery case. This battery case includes electrode terminals which are extended from the inside to the outside of the battery case. The negative electrode current collector is in electrical communication with the anode compartment, and the positive electrode current collector is in electrical communication with the cathode compartment. Suitable materials for the anode current collector may include aluminium, tungsten, titanium, nickel, copper, molybdenum, and combinations of two or more thereof. Other suitable materials for the anode current collector may include carbon. The positive electrode current collector may be a wire, paddle or mesh formed from aluminium, palladium, gold, nickel, copper, carbon or titanium. The current collector may be plated or clad.

As will be appreciated by those skilled in the art, the battery of the present invention may be implemented in a variety of configurations and designs. For example, it can take a planar configuration (FIGS. 2a and 2b) or a tubular configuration (FIG. 3) in which the different components are contained inside a tubular assembly or housing to form the battery.

In a particular embodiment, the battery has a planar configuration. Referring to FIG. 2a, the planar battery includes a negative electrode compartment (1) which comprises the solid metallic sodium, and a positive electrode compartment (2), wherein both compartments are separated by the solid ceramic electrolyte (3). In this particular figure, said solid electrolyte (3) is in contact on its cathode side with glass fiber (4) impregnated in the catholyte. The positive electrode compartment (2) comprises the Na-insertion compound constituting the positive electrode which is immersed in the catholyte composition as defined above.

The negative electrode compartment (1) is covered with a negative casing (5), whereas the positive electrode compartment (2) is covered with a positive casing (6). Both casings are made, for example, of a conductive material, such as a metal. The negative casing (5) and the positive casing (6) are fixed by a fixed member (7), such as a bolt and a nut.

Additionally, an electrical insulating material (8) is provided around a peripheral portion of the positive electrode compartment (2), and an electrical insulating material (8) is also provided around a peripheral portion of the negative electrode compartment (1) or/and positive electrode compartment (2). Thus, both compartments are electrically isolated from each other.

A current collector (9) electrically connected to the positive casing (6) is provided in an upper portion of the positive electrode compartment (2).

FIG. 2b describes also the same planar configuration having also glass fiber (10) on the anode side of the solid electrolyte.

In another particular embodiment, the battery of the invention has a tubular configuration. In this configuration the battery includes a housing or cell casing having an interior surface defining a volume. The solid electrolyte is disposed in the volume. Said electrolyte has a first surface that defines at least a portion of a first compartment (negative electrode compartment), and a second surface that defines the second compartment (positive electrode compartment). The first compartment is in ionic communication with the second compartment through the solid electrolyte. As used herein, the phrase "ionic communication" refers to the traversal of ions between the first compartment and the second compartment through the solid electrolyte.

Referring to FIG. 3, a battery having tubular configuration is provided. More particularly, a front cross-sectional view of the battery is depicted. The battery includes a housing or cell casing (10) having an interior surface defining a volume where all the components of the battery are located. The solid ceramic electrolyte (3) is disposed inside the housing (10). Said electrolyte (3) has a first surface that defines the negative electrode compartment (1) comprising the metallic sodium, and a second surface that defines the positive electrode compartment (2). Thus, said electrolyte acts also as a separator between both compartments. Additionally, an anode current collector (11) is connected to the negative electrode compartment (1) and a positive current collector (9) is disposed inside the positive electrode compartment (2). The positive electrode compartment comprises the Na-insertion compound constituting the positive electrode which is immersed in the catholyte composition as defined above.

An electrical insulating material (8) is provided around the perimeter of the housing (10) so as the negative electrode and positive electrode compartments are electrically isolated from each other. The negative electrode compartment and the positive electrode compartment can also be fixed by a fixed member, such as a bolt and a nut.

Optionally, one or more shim structures can be disposed within the volume of the housing. This shim structures support the solid electrolyte within the volume of the housing. This shim structures can protect the solid ceramic electrolyte from vibrations caused by the motion of the battery during use, and thus reduce or eliminate movement of the solid electrolyte relative to the housing.

The battery of the invention can be used as an energy storage device, being rechargeable over a plurality of charge-discharge cycles. The energy storage device can be employed in a variety of applications, and the plurality of cycles for recharge is dependent on factors such as, charge and discharge current, depth of discharge, cell voltage limits, and the like.

Multiple batteries can be stacked to form a stack or module system. Therefore, another aspect of the present invention refers to a module system which comprises at least two stacked batteries as defined above. This system comprises battery repeating units stacked into a module with a variable power output depending upon the final application.

The battery repeating units are connected by means of designs that minimize ohmic losses and guarantee sufficient power supply.

The materials used to interconnect the battery repeating units can be metallic or ceramic, with the required coatings/treatments to assure compatibility with other components. The electrochemical connections between single repeating units to form the stack or module system can be either in series or in parallel.

In a particular embodiment, each battery repeating unit, in either planar or tubular configuration, is connected in parallel with the adjacent battery repeating unit to form a bundle. The set of bundles are further connected in series to build up the specific power specifications.

In another particular embodiment, each battery repeating unit, in either planar or tubular configuration, is connected in series with the adjacent battery repeating unit to form a bundle. The set of bundles are further connected in parallel or series to build up the specific power specifications.

The stack or module system can be sealed by means of ceramic or metal pastes and/or felts that withstand operating conditions.

EXAMPLES

Example 1. Evaluation of the Adhesion Properties of the Na/$\beta''$-Al$_2$O$_3$ Interface Different pressures were tested to evaluate the adhesion properties of the Na/$\beta''''$-Al$_2$O$_3$ interface below the melting point of Na (98° C.). In order to compare the effect of pressure, Na/$\beta''$-Al$_2$O$_3$/Na symmetric systems were prepared and electrochemically tested. $\beta''$-Al$_2$O$_3$ discs with 1 cm diameter, 500 μm thickness, 98-99% density, and ~1.6 mS/cm ionic conductivity were used to perform the following experiments. Above 10 kg/cm$^2$ the interface showed good apparent adhesion and was electrochemically evaluated by sodium plating/stripping tests below the melting point of sodium (98° C.).

Na electrodes (metallic foil) of 4 mm diameter with 1 mm thickness were pressed on each side of the $\beta''$-Al$_2$O$_3$. Pressure between 10-1000 kg/cm$^2$ on Na/$\beta''$-Al$_2$O$_3$ was applied to stick the Na electrodes on both sides of the $\beta''$-Al$_2$O$_3$ disc. Above such range the $\beta''$-Al$_2$O$_3$ disc was observed to break; below such range, the Na electrodes were not sticking to the $\beta''$-Al$_2$O$_3$ disc.

Among all the pressures tested, the value of 130 kg/cm$^2$ was selected to test the electrochemical performance of a system consisting of pressed Na/$\beta''$-Al$_2$O$_3$/Na.

Figure 4:
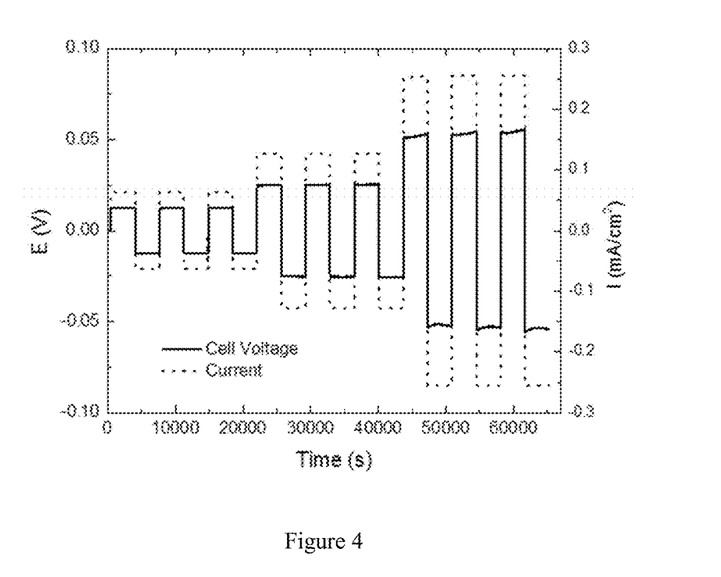
FIG. 4. Plating and stripping tests on Na/β"-Al$_2$O$_3$/Na system under 63, 127 and 255 µA/cm² for 60 min pulses at 55° C.
Figure 5:
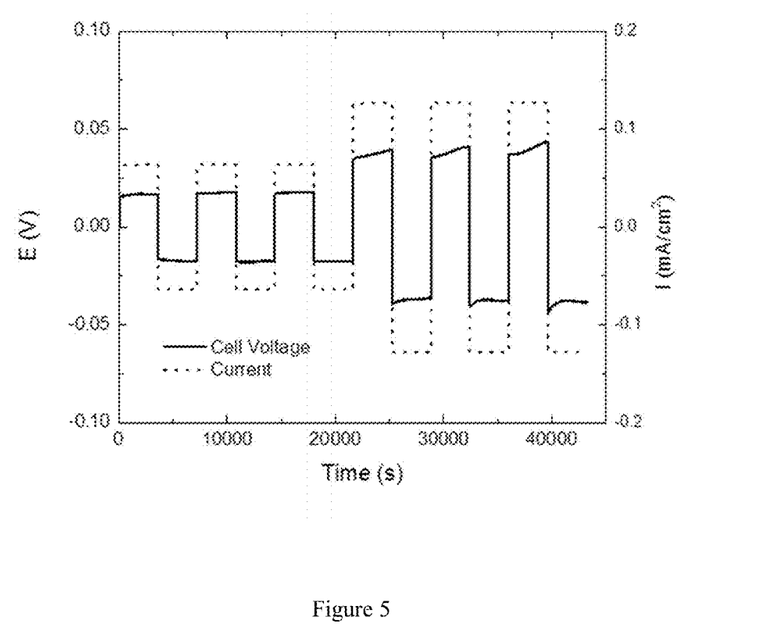
FIG. 5. Plating and stripping tests on Na/β"-Al$_2$O$_3$/Na under 63 and 127 µA/cm² for 60 min pulses at 22° C.

Thus, a pressure of 130 kg/cm$^2$ was applied on Na/$\beta''$-Al$_2$O$_3$ which led to the coverage of the whole $\beta''$-Al$_2$O$_3$ disc surface with sodium. Current pulses of 60 min ranging from 63 to 255 μA/cm$^2$ were applied to this system. The results for plating and stripping tests at 55° C. and 22° C. are shown in FIGS. 4 and 5. Excellent cycling properties (i.e. stripping and platting of the Na at the interfaces) can be observed with a polarization below 0.1 V for a current of 255 μA/cm$^2$. Most remarkably, the systems were not showing any sign of failure under these conditions. An increase of the system operating temperature leads to a better interface, i.e. a lower cell polarization.

Example 2. Sodium Ceramic Battery with and without Beta''-Alumina Solid Electrolyte with Planar Configuration Using Na[Fe$_{0.4}$Ni$_{0.3}$Ti$_{0.3}$]O$_2$ as the Positive Electrode and Operating at 55° C.

Fabrication of the Positive Electrode

Stoichiometric amounts of Na$_2$CO$_3$ (99.5% purity supplied by Sigma Aldrich), Fe$_2$O$_3$ (99% purity supplied by Alfa Aesar), NiO (Ni 78.5% purity supplied by Alfa Aesar) and TiO$_2$ (99.9% purity supplied by Alfa Aesar) were ball milled at 300 rpm for 1 hour and the resulting powder was pressed into a pellet. The pellet was calcined in air at 900° C. for 16 hours and quenched in liquid N$_2$ to thereby obtain Na[Fe$_{0.4}$Ni$_{0.3}$Ti$_{0.3}$]O$_2$. After quenching, the pellet was introduced and stored in an Ar filled glove box (<5 ppm of H$_2$O) in order to avoid any moisture contamination.

Na[Fe$_{0.4}$Ni$_{0.3}$Ti$_{0.3}$]O$_2$ obtained above, carbon black (supplied by Timcal) and poly(vinylidene fluoride) (supplied by Alfa Aesar) diluted in N-methylpyrrolidone (supplied by Sigma Aldrich) were mixed at a mass ratio of 75:15:10 and thereafter coated onto an Al foil to fabricate the positive electrode. The positive electrode was cut in 10 mm diameter discs, calendered under 5 tons of uniaxial pressure and dried under vacuum.

Fabrication of the Catholyte

NaFSI (manufactured by Solvionic) was dissolved in N-propyl-N-methylpyrrolidinium bis(fluorosulfonyl)imide (manufactured by Solvionic), hereafter referred as C$_3$C$_1$pyrr [FSI], with a molar ratio of 2:8 and stirred for 2 hours inside an Ar filled glove box (<5 ppm of H$_2$O) in order to avoid any moisture contamination.

Fabrication of Battery

The cells were assembled in an Ar filled glove box in a CR2032 coin cell configuration with stainless steel parts as both anode and cathode current collectors.

The positive electrode fabricated as above was set on top of the bottom part of the coin cell.

A glass fibre (manufactured by Whatman) was set on top of the positive electrode and the catholyte fabricated as above was added.

A 0.5 mm thick beta''-alumina disc (if it applies) (manufactured by Ionotec) was placed on top of the glass fibre impregnated with the catholyte.

The negative electrode made of sodium metal (manufactured by Panreac) was set on top of the beta''-alumina disc or on top of the glass fibre. Pressure was applied in order to ensure good contact between the negative electrode and the solid electrolyte.

The top part or the coin cell was used for anode current collection and sealing to thereby fabricate the battery.

Evaluation

Cells were tested in this planar configuration at 55° C., where sodium is in the solid state. FIG. 6a shows the first galvanostatic charge-discharge curves with and without $\beta''$-Al$_2$O$_3$ (~126 mAh/g and ~140 mAh/g respectively) in the voltage window of 3.75-2.6 V.

Unexpectedly no significant increase in the polarization is observed which evidences that the ohmic contribution in the electrochemical performance of the solid electrolyte and the anode/solid electrolyte interface (i.e. Na/$\beta''$-Al$_2$O$_3$ contact) is negligible. Slightly lower capacity of the cell with $\beta''$-Al$_2$O$_3$ is attributed to the non-optimized cathode material loading and variability in cell fabrication.

Cycling performance over 70 cycles is plotted in FIG. 6b for two cells with and without $\beta''$Al$_2$O$_3$ with comparable capacity fade, which demonstrates that the addition of the solid electrolyte does not affect to the cycling performance.

Example 3. Sodium Ceramic Battery with and without β"-Al$_2$O$_3$ Solid Electrolyte with Planar Configuration Using Na$_{2/3}$[Mg$_{0.2}$Mn$_{0.8}$]O$_2$ as the Positive Electrode and Operating at 55° C.

For comparative purposes, in order to demonstrate that equivalent results are obtained with the proposed new system for different insertion cathode materials, cells with a different insertion cathode have been analyzed. Cells with and without β"-Al$_2$O$_3$ were tested, again showing unexpectedly low polarization losses even with the addition of a 0.5 mm thick solid electrolyte. In particular, a battery having P2-type Na$_{2/3}$[Mg$_{0.2}$Mn$_{0.8}$]O$_2$ as positive electrode and NaFSI:C$_3$C$_1$pyrr[FSI] with a molar ratio of 2:8 as catholyte showed fifth cycle charge/discharge capacity of about 150 mAh/g when tested in the coin cell configuration at 55° C. with and without β"-Al$_2$O$_3$ solid electrolyte.

Fabrication of the Positive Electrode

Stoichiometric amounts of Na$_2$CO$_3$ (99.5% purity fabricated by Sigma Aldrich), Mn$_2$O$_3$ (98% purity supplied by Alfa Aesar) and MgO (99% purity supplied by Alfa Aesar) were ball milled at 300 rpm for 1 hour and the resulting powder was pressed into a pellet. The pellet was calcined in air at 900° C. for 15 hours and free cooled inside the furnace to thereby obtain Na$_{2/3}$[Mg$_{0.2}$Mn$_{0.8}$]O$_2$. After cooling, the pellet was introduced and stored in an Ar filled glove box (<5 ppm of H$_2$O) in order to avoid any moisture contamination.

Na$_{2/3}$[Mg$_{0.2}$Mn$_{0.8}$]O$_2$ obtained above, carbon black (fabricated by Timcal) and poly(vinylidene fluoride) (supplied by Alfa Aesar) diluted in N-methylpyrrolidone (supplied by Sigma Aldrich) were mixed at a mass ratio of 75:15:10 and thereafter coated onto an Al foil to fabricate the positive electrode. The positive electrode was cut in 10 mm diameter discs, calendered under 5 tons of uniaxial pressure and dried under vacuum.

Fabrication of the Catholyte

NaFSI (manufactured by Solvionic) was dissolved in C$_3$C$_1$pyrr[FSI] (manufactured by Solvionic) with a molar ratio of 2:8 and stirred for 2 hours inside an Ar filled glove box (<5 ppm of H$_2$O) in order to avoid any moisture contamination.

Fabrication of Battery

The cells were assembled in an Ar filled glove box in a CR2032 coin cell configuration with stainless steel parts as both anode and cathode current collectors.

The positive electrode fabricated as above was set on top of the bottom part of the coin cell.

A glass fibre (manufactured by Whatman) was set on top of the positive electrode and the catholyte fabricated as above was added.

A 0.5 mm thick beta"-alumina disc (if it applies) (manufactured by Ionotec) was placed on top of the glass fibre impregnated with the catholyte.

The negative electrode made of sodium metal (manufactured by Panreac) was set on top of the beta"-alumina disc or on top of the glass fibre. Pressure was applied in order to ensure good contact between the negative electrode and the solid electrolyte.

The top part or the coin cell was used for anode current collection and sealing to thereby fabricate the battery.

Evaluation

Cells were tested in this planar configuration at 55° C., where sodium is in the solid state. FIG. 7a shows the electrochemical performance achieved with and without beta"-alumina (~150 mAh/g) in the voltage window of 3.9-1.5 V. FIG. 7b shows the battery performance with and without beta"-alumina over 30 cycles.

Equivalent to what is evidenced in Example 2, unexpectedly no significant increase in polarization losses is observed with the addition of the ceramic electrolyte. Therefore, it can be concluded that although it could be expected that the addition of the β"-Al$_2$O$_3$ would affect significantly to the cell performance due to the poor anode/solid electrolyte contact, the addition of the β"-Al$_2$O$_3$ makes the system safer without considerably affecting the performance.

The invention claimed is:

1. A sodium-ion battery comprising:

a) a positive electrode compartment comprising a positive electrode, said positive electrode comprising a compound selected from the group consisting of a sodium transition metal based oxide of formula (I):

$$Na_xM_yO_w \quad (I)$$

wherein M is a transition metal ion or a combination of multivalent ions comprising at least one transition metal ion; $0 < x \leq 1$; $0 < y \leq 1$; $w \geq 2$;

and a sodium metal salt of formula (II)

$$Na_xM_y(XO_4)_vF_z \quad (II)$$

wherein M is a transition metal ion or a combination of multivalent ions comprising at least one transition metal; X is S or P; $0 < x \leq 3$; $0 < y \leq 2$; $1 \leq v \leq 3$; $0 \leq z \leq 3$;

b) a negative electrode compartment comprising a negative electrode, said negative electrode comprising solid metallic sodium or an alloy comprising solid metallic sodium;

c) an electrolyte composition comprising a solid sodium-ion conductive ceramic electrolyte, wherein said ceramic electrolyte has:

an anode side in contact with the solid metallic sodium, or with the alloy comprising solid metallic sodium, comprised in the negative electrode of the negative electrode compartment, and a cathode side in contact with the positive electrode compartment, so as said solid sodium-ion conductive ceramic electrolyte separates the negative and positive electrode compartments;

a catholyte, said catholyte comprising a catholyte compound selected from a catholyte metallic salt represented by the formula (III) or a mixture thereof $$MY \quad (III)$$

wherein

M is a cation selected from the group consisting of an alkali metal and an alkali-earth metal; and Y is an anion selected from the group consisting of $R^1SO_2NSO_2R^2$, $CF_3SO_3^-$, $C(CN)_3^-$, $B(C_2O_4)_2^-$ and $BF_2(C_2O_4)^-$, wherein $R_1$ and $R_2$ are independently selected from fluorine or a fluoroalkyl group;

and a catholyte salt selected from the group consisting of NaSbF$_6$, NaAsF$_6$, NaBF$_4$, NaClO$_4$, NaPF$_6$ and a mixture thereof, dissolved in an organic solvent or in an ionic liquid;

wherein said catholyte is located within the positive electrode compartment in contact with the positive electrode and with the cathode side of the solid ceramic electrolyte;

wherein the solid sodium-ion conductive ceramic electrolyte, and the solid metallic sodium or the alloy comprising solid metallic sodium comprising negative electrode have a contact pressure ranging from 10 to 1,000 kg/cm$^2$.

2. The sodium-ion battery according to claim 1, wherein the transition metal ion in the metal salts of formula (I) and (II) is selected from the group consisting of titanium, vanadium, chromium, molybdenum, tungsten, manganese, iron, osmium, cobalt, nickel, palladium, platinum, copper, silver, gold, zinc, cadmium, magnesium, calcium, beryllium, strontium, barium, aluminium, boron, niobium, antimony, tellurium, tantalum, bismuth, selenium ions and combinations thereof.

3. The sodium-ion battery according to claim 1, wherein the sodium transition metal based oxide of formula (I) is selected from the group consisting of $Na_xFeO_2$, $Na_xMnO_2$, $Na_x(Fe_\alpha Mn_\beta)O_2$, $Na_x(Mg_\alpha Mn_\beta)O_2$, $Na_x(Fe\alpha Ni_\beta Ti_\gamma)O_2$, wherein $0<x\leq1$; $0<\alpha+\beta\leq1$; $0<\alpha+\beta+\gamma\leq1$.

4. The sodium-ion battery according to claim 1, wherein the sodium metal salt of formula (II) is selected from the group consisting of $NaFePO_4$, $Na_2FePO_4F$, $Na_2Fe_{1-n}Mn_nPO_4F$ (0<n<1), $Na_3V_2O_{2x}(PO_4)_2F_{3-2x}$ (0<x<1) and $NaVPO_4F$.

5. The sodium-ion battery according to claim 1, wherein the positive electrode further comprises a conductive additive.

6. The sodium-ion battery according to claim 1, wherein the solid sodium-ion conductive ceramic electrolyte is selected from the group consisting of β-alumina, β'-alumina, β"-alumina, $Na_{3-x}Zr_2Si_{2+x}P_{1+x}O_{12}$ wherein $-1\leq x\leq2$, and alkali-silicon sulfide glasses.

7. The sodium-ion battery according to claim 1, wherein the catholyte metallic salt represented by the formula (iii) or the mixture thereof is dissolved in an organic solvent or in an ionic liquid.

8. The sodium-ion battery according to claim 1, wherein the content of solid metallic sodium in the negative electrode is higher than 90 wt %.

9. The sodium-ion battery according to claim 1, wherein the negative electrode consists of solid metallic sodium.

10. The sodium-ion battery according to claim 1, wherein the electrolyte composition further comprises a layer of a porous material on the cathode side of the solid sodium electrolyte in contact with it, being this layer of the porous material impregnated in the catholyte.

11. The sodium-ion battery according to claim 1, wherein the catholyte metallic salt of formula (III) is selected from the group consisting of LiFSI, NaFSI, KFSI, RbFSI, CsFSI, $Mg(FSI)_2$, $Ca(FSI)_2$, $Sr(FSI)_2$ and $Ba(FSI)_2$, LiTFSI, NaTFSI, KTFSI, RbTFSI, CsTFSI, $Mg(TFSI)_2$, $Ca(TFSI)_2$, $Sr(TFSI)_2$, $Ba(TFSI)_2$, and combinations of two or more thereof.

12. The sodium-ion battery according to claim 1, wherein the catholyte metallic salt of formula (III) is $Na[R^1SO_2NSO_2R^2]$, wherein $R^1$ and $R^2$ are independently selected from fluorine and a fluoroalkyl group.

13. The sodium-ion battery according to claim 1, wherein the catholyte comprises a mixture of NaFSI and KFSI or a mixture of NaFSI and NaTFSI.

14. The sodium-ion battery according to claim 1, wherein the contact pressure ranges from 50 to 500 kg/cm$^2$.

15. The sodium-ion battery according to claim 1, wherein the contact pressure ranges from 100 to 200 kg/cm$^2$.

16. The sodium-ion battery according to claim 1, which is designed in a planar or tubular configuration.

17. A module system which comprises at least two stacked batteries as defined in claim 1.

18. An energy storage device comprising the battery as defined in claim 1.

* * * * *